(No Model.)
S. C. C. CURRIE.
METHOD OF MAKING PLATES FOR SECONDARY BATTERIES.
No. 459,491. Patented Sept. 15, 1891.
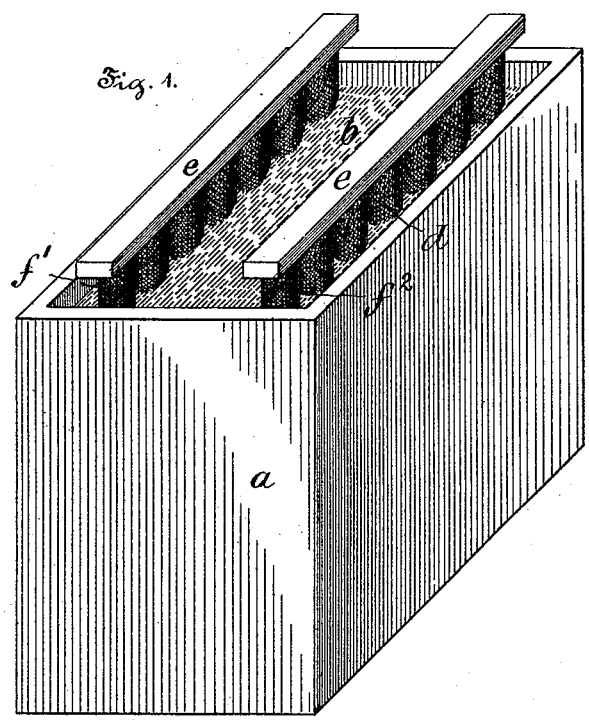
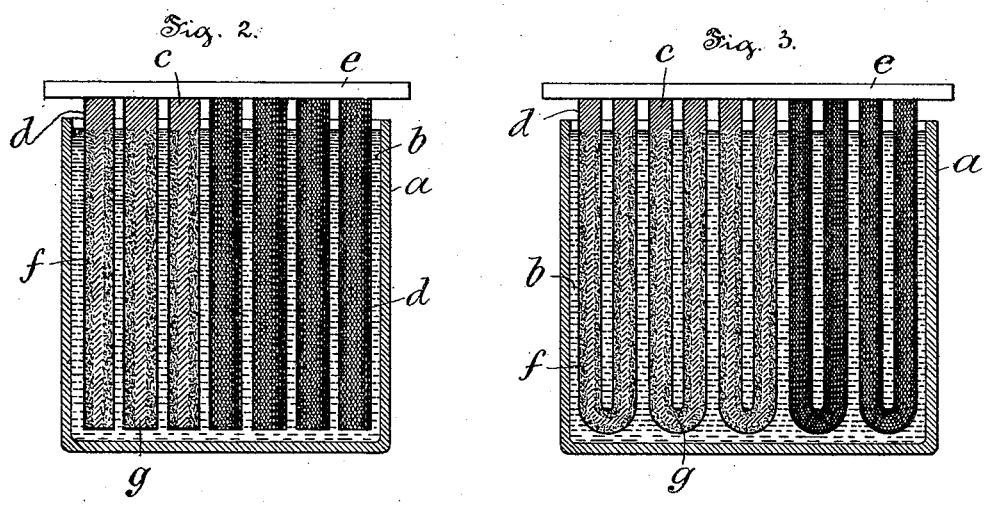

UNITED STATES PATENT OFFICE.

STANLEY CHARLES CUTHBERT CURRIE, OF PHILADELPHIA, PENNSYLVANIA, ASSIGNOR TO THE UNITED GAS IMPROVEMENT COMPANY, OF SAME PLACE.

METHOD OF MAKING PLATES FOR SECONDARY BATTERIES.

SPECIFICATION forming part of Letters Patent No. 459,491, dated September 15, 1891.

Application filed January 24, 1891. Serial No. 378,865. (No model.)

*To all whom it may concern:*

Be it known that I, STANLEY CHARLES CUTHBERT CURRIE, a subject of the Queen of Great Britain, but now residing at the city of Philadelphia, in the county of Philadelphia and State of Pennsylvania, have invented certain new and useful Improvements in the Method of Making the Plates or Elements of a Secondary or Storage Battery, of which the following is a specification.

My invention relates to a method of making the plates or elements of a so-called "secondary" or "storage" battery. Hitherto the methods generally employed for the manufacture of the plates or elements of a secondary or storage battery have either been the purely electrolytic or the mechanical of applying under pressure lead oxides to a conducting frame or support.

My present invention has relation to and is based upon the former method, but involving certain novel and important features in connection with the manufacture of plates or elements for use as a secondary or storage battery.

My invention consists of an efficient and expeditious method of subjecting cast or rolled lead enveloped or incased in woven or braided fibrous material in a suitable solution to electrolytic action to cause a partial penetration and conversion of the same to a salt state and the reduction of the enveloped or incased partially-penetrated and converted lead to a spongy or porous metallic condition without affecting the internal metallic body thereof, which forms the conducting part or portion of the plate or element when mounted in a battery.

My invention further consists of the certain other features in the method of producing a battery plate or element hereinafter described, and pointed out in the claims.

Hitherto the principal objections to the method of reducing a plate of lead of similar material by electrolytic action to a spongy state or condition in a solution of dilute sulphuric acid has been the extreme length of time required to render the same spongy or porous and of sufficient thickness or bulk for practical purposes. This method, as is well known, requires a number of reversals of the electric current, so that it is impossible to attain the required result without a constant repetition of the treatment, the principal reason being that only the surface of the lead was oxidized at first; but just as soon as this small amount was fully oxidized the oxygen, being unable to be further taken up by the lead, escaped in the form of a gas. This of course is the case when simple lead constitutes the elements and they are immersed in a bath composed of dilute sulphuric acid.

I have discovered by a series of experiments that it is possible to penetrate into a plate or block of ordinary lead by electrolytic action in such a manner as that but one or two reversals of current are required, and that the lead can be quickly and effectually penetrated to the required depth; and, moreover, that the salt of lead into which such plate or block is converted in the first instance is brought to such a state or condition as to be readily reducible again to lead in a soft, spongy, or porous metallic condition, and afterward formed by the ordinary process or treatment with but one or two reversals. The principle above defined forms the basis upon which my present invention is founded, and I adopt the line of action hereinafter prescribed for practically and efficiently carrying the same into effect. For example, two plates or blocks of lead are immersed in a suitable liquid or bath and in a solution in which the lead is insoluble, the blocks or plates of lead being arranged therein as anodes and cathodes. An electric current is then passed, which causes in a short period of time the anode to be gradually but uniformly transformed to the required depth, forming thereby a layer or thick film of lead salt as a part thereof and of such general character as experience has demonstrated may be quickly transformed by a simple reversal of current into porous metallic lead or to a spongy metallic state or condition for use as an element of a battery when mounted in a suitable electrolyte, such as dilute sulphuric acid, the element being formed therein in the ordinary manner. As the plate or element is thus produced in a porous or spongy condition no constant reversals of current are required. The solution to mount the plate or block of lead in for its conversion in the first instance is preferably composed of dilute chloride of zinc, ($ZnCl_2$.)

It has been ascertained by practical experiment that if a current is passed from a lead anode to a lead cathode in a solution of zinc chloride lead chloride is formed upon the surface and extending into the body thereof, (without any escape of gas;) yet if the plate so treated was not otherwise protected this lead chloride would fall to the bottom of the tank, thereby rendering the plate or block practically useless. To obviate such difficulty presented or disadvantageous feature arising, means have been devised forming a part of the present invention in which the lead chloride so formed is retained to the internal body of the plate or block without interfering in any manner with the converting or transforming step of the process for the production of the battery element, this step being permitted according to my invention to continue under due regulation until the required depth of lead chloride is formed. As soon as the required depth of chloride surface has been obtained, which can be readily ascertained from the quantity of current permitted to pass, it is transferred and becomes the cathode element of the tank. As the solution of the tank is dilute chloride of zinc, when a current is caused to pass there is deposited metallic zinc on the cathode. This metallic zinc, it has been found, hastens the reduction of the lead chloride of the cathode to a metallic state or condition and remains—that is to say, the zinc in the solution—and thus it may be used over and over again. The retaining medium for the plate or block of lead during its aforesaid treatment, as well as during its use as a battery element, preferably consists of a casing or covering of woven or braided asbestus or analogous material.

In the practice of the present invention it is preferred that the lead plates or elements in the first instance should be simply a series of rods or wires. When the plates are in the form of blocks or plates of lead, as in the first instance mentioned, the asbestus will be cut in lengths and suitably applied thereto, and the lead in molten state poured into suitable molds, and the lengths of asbestus subsequently caused to surround or envelop the same, while in the latter case the asbestus will be braided or otherwise caused to surround the lead wires or rods and the rods or wires then preferably formed into a series of loops with a single conductor therefor, each series of the rods or wires, with the woven or braided asbestus around them, constituting a plate. The hereinbefore-described method and manner of constructing the plates applies more particularly to the peroxide plates. The asbestus covering of the plates is retained and effectually prevents disintegration of the peroxide plates after continuous action in use as a storage-battery.

Having fully described the nature of the invention and pointed out the particular features thereof, I will now refer to the accompanying drawings, illustrating the mode of treating such materials for the production of a battery plate or element such as hereinbefore described, and in which—

Figure 1 is a perspective view of a tank, showing two plates embodying the features of my invention arranged as anodes and cathodes therein immersed in a suitable solution, and this view illustrating a preferred mode of carrying my invention into effect. Fig. 2 is a vertical section through a tank, showing a plate composed of a series of depending blocks of lead or analogous material, shown partly in elevation and partly in section to more fully illustrate the manner of penetrating into the body of each block or rod of the series constituting the plate on each side or around about the outer surface thereof, and showing also the central core or body of ordinary lead undisturbed by such action to become a part of the conducting means with the horizontal bar or rod burned or otherwise applied to the upper parts of the series of blocks constituting the battery-plate; and Fig. 3 is a modified form of plate embodying the particular features of my invention.

Referring to the drawings, $a$ is a tank constructed of any suitable material and of any preferred form. $b$ is a suitable solution contained in said tank and preferably composed of dilute chloride of zinc.

$c$ are the series of blocks, rods, or wires of lead or analogous material enveloped or incased in a covering or case $d$, preferably composed of woven or braided asbestus or analogous material, and $e$ is a conductor burned or otherwise applied to the top of the series of blocks, rods, or wires $c$ constituting the plate.

$f$, Figs. 2 and 3, represents in section the blocks or rods eaten into or penetrated by the electrolytic action permitted to take place in the tank $a$ and converted by such action into a condition of lead chloride, and then by a simple reversal of current reduced to a soft, spongy, or porous metallic condition, and $g$ represents the internal body or solid core maintained free from such action and in its normal state or condition as metallic lead, and in such condition becomes a most excellent conductor in the subsequent use of the plate as an element of a secondary battery.

The method of carrying my invention into effect is as follows: The plate or anode (designated in Fig. 1 by the letter $f'$) mounted in the tank $a$ after the passing of a current for a required time becomes coated on the surface of the lead beneath the asbestus or analogous outer woven or braided covering or casing with a layer of chloride of lead ($PbCl_2$) and to the required depth thereof. It is then removed and replaces the plate or cathode (designated by the letter $f^2$) in the tank $a$, which by this time has been reduced as far as the internal core or body thereof to a porous or soft spongy metallic state or condition for use, and so on in regular succession, and in a similar manner plates to be treated are placed in the tank $a$, immersed in the solution composed, preferably, of dilute chloride of zinc for the aforesaid treatment, the solution being constantly recovered in the manner hereinbefore fully described.

Instead of employing chloride of zinc, use may be made of chloride of iron; but preference is given to the employment of the former for the purpose.

Having thus described the nature and objects of the invention, what I claim as new, and desire to secure by Letters Patent, is—

1. The herein-described method of making a battery plate or element, which consists in subjecting in a suitable solution of a chloride of a metal lead enveloped or incased in woven or braided fibrous material to electrolytic action to cause a partial penetration and conversion of the lead to a state or condition of a salt of lead, and then reducing the same to a soft, spongy, or porous metallic state or condition, for the purposes set forth.

2. The herein-described method of making battery plates or elements, which consists in immersing as anodes and cathodes provided with conductors in a solution of a chloride of a metal lead plates, blocks, rods, or wires containing a surrounding covering or casing of a fibrous material, then causing an electric current to pass so as to penetrate a portion thereof and convert the same into the condition of a salt of the metal, and then reversing the current to reduce the same to a spongy state or condition, for the purposes set forth.

3. The herein-described method of making a battery plate or element, which consists in immersing in a solution of chloride of zinc cast or rolled lead enveloped or incased in woven or braided asbestos, as anodes and cathodes in said solution, then passing a current and penetrating the lead to the required depth for converting the same to a salt state, and then reducing the penetrated and converted lead to a spongy or porous metallic state or condition, for the purposes set forth.

4. The herein-described method of making a battery plate or element, which consists in immersing in a solution of chloride of zinc cast or rolled lead enveloped or incased in woven or braided asbestos by electrolytic action to cause the penetration of the lead to a defined depth and its conversion into chloride of lead, while the solid core or internal body is maintained in a metallic state, and then reducing said chloride of lead to a soft, spongy, or porous metallic state, for the purposes set forth.

5. The herein-described method of making a battery plate or element, which consists in converting electrolytically cast or rolled lead enveloped or inclosed in asbestos or analogous material in a solution composed of a chloride of a metal to a salt state, then reducing the same to a spongy or porous metallic condition, and then employing said solution for immersing other plates, bars, rods, or blocks enveloped or incased in asbestos or analogous material therein, substantially in the manner described, and for the purposes set forth.

In witness whereof I have hereunto set my signature in the presence of two subscribing witnesses.

STANLEY CHARLES CUTHBERT CURRIE.

Witnesses:
THOMAS M. SMITH,
RICHARD C. MAXWELL.